(12) United States Patent
Sakatani et al.

(10) Patent No.: US 9,533,595 B2
(45) Date of Patent: Jan. 3, 2017

(54) VEHICULAR BATTERY SYSTEM AND VEHICLE EQUIPPED WITH SAME

(71) Applicant: SANYO Electric Co., Ltd., Osaka (JP)

(72) Inventors: Toshihiro Sakatani, Hyogo (JP); Hiromasa Sugii, Hyogo (JP); Makoto Ochi, Hyogo (JP); Ryuuji Kawase, Hyogo (JP)

(73) Assignee: SANYO ELECTRIC CO., LTD., Osaka (JP)

( * ) Notice: Subject to any disclaimer, the term of this patent is extended or adjusted under 35 U.S.C. 154(b) by 147 days.

(21) Appl. No.: 14/408,566

(22) PCT Filed: Nov. 29, 2012

(86) PCT No.: PCT/JP2012/080909
§ 371 (c)(1),
(2) Date: Dec. 16, 2014

(87) PCT Pub. No.: WO2014/038100
PCT Pub. Date: Mar. 13, 2014

(65) Prior Publication Data
US 2015/0321575 A1    Nov. 12, 2015

(30) Foreign Application Priority Data
Sep. 5, 2012  (JP) ................................. 2012-195250

(51) Int. Cl.
*B60L 11/18*     (2006.01)
*H02J 7/14*      (2006.01)

(52) U.S. Cl.
CPC ........ *B60L 11/1859* (2013.01); *B60L 11/1816* (2013.01); *B60L 11/1868* (2013.01); *H02J 7/1423* (2013.01); *Y02T 10/7005* (2013.01); *Y02T 10/7016* (2013.01); *Y02T 10/7066* (2013.01)

(58) Field of Classification Search
CPC ...................................................... H02J 7/1423
USPC ......................................................... 320/109
See application file for complete search history.

(56) References Cited

U.S. PATENT DOCUMENTS

| | | | | |
|---|---|---|---|---|
| 2010/0141209 A1* | 6/2010 | Shiu | ...................... | H02J 7/0016 320/120 |
| 2011/0029221 A1 | 2/2011 | Minamitani et al. | | |
| 2014/0111145 A1* | 4/2014 | Mitsuda | .................. | B60L 11/14 320/107 |

FOREIGN PATENT DOCUMENTS

| | | |
|---|---|---|
| JP | 9-247850 | 9/1997 |
| JP | 2001-090828 | 4/2001 |
| JP | 2003-219575 | 7/2003 |
| JP | 2007-046508 | 2/2007 |
| JP | 2010-004627 | 1/2010 |
| JP | 2011-027077 | 2/2011 |
| JP | 2011-176958 | 9/2011 |
| JP | 2011-198549 | 10/2011 |
| JP | 2012-152003 | 8/2012 |

OTHER PUBLICATIONS

International Search Report of PCT application No. PCT/JP2012/080909 dated Mar. 5, 2013.

* cited by examiner

*Primary Examiner* — Thuan Do
(74) *Attorney, Agent, or Firm* — Wenderoth, Lind & Ponack, L.L.P.

(57) ABSTRACT

In a battery system for a vehicle, a lead battery is connected in parallel to a sub-battery, and a charging resistance r2 of the sub-battery 2 is lower than a charging resistance r1 of the lead battery.

13 Claims, 2 Drawing Sheets

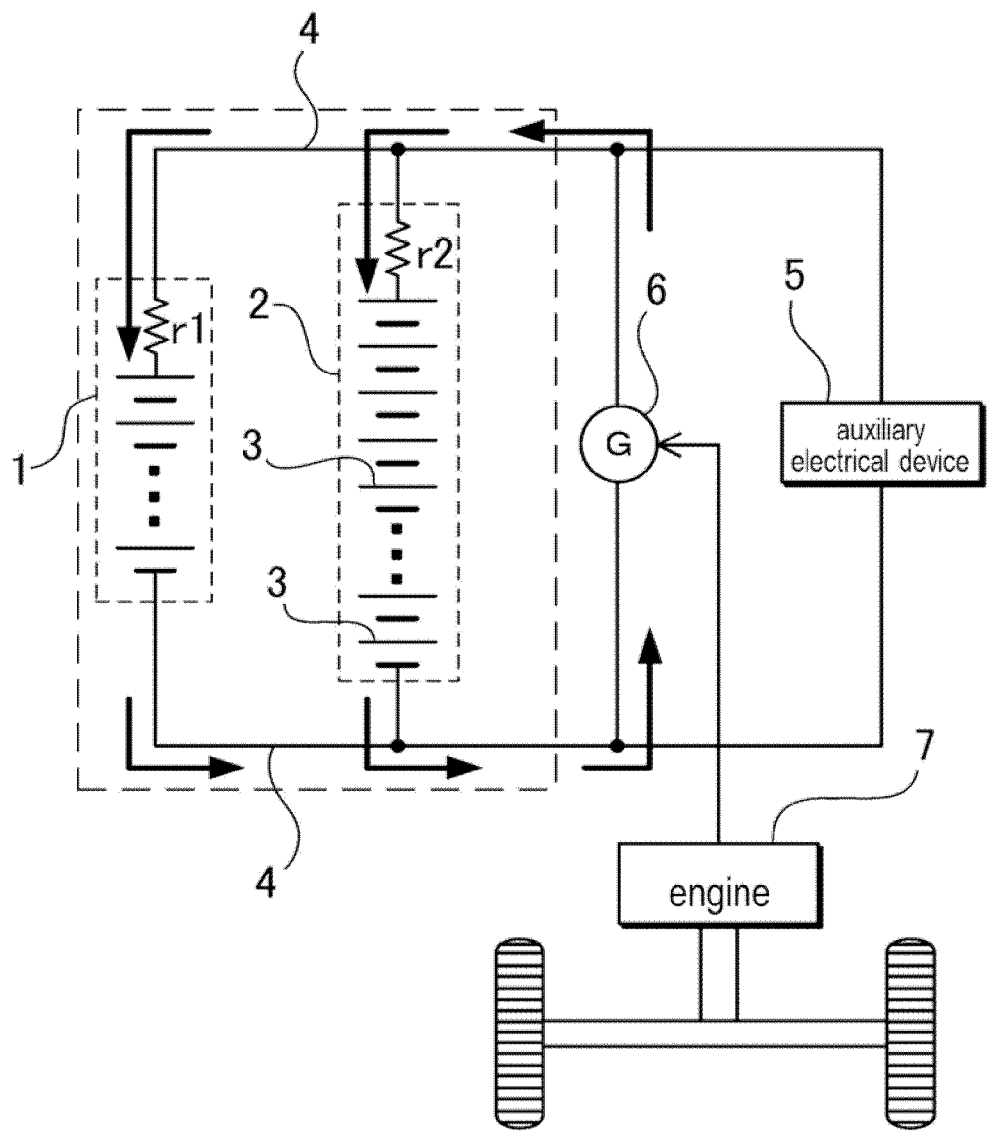

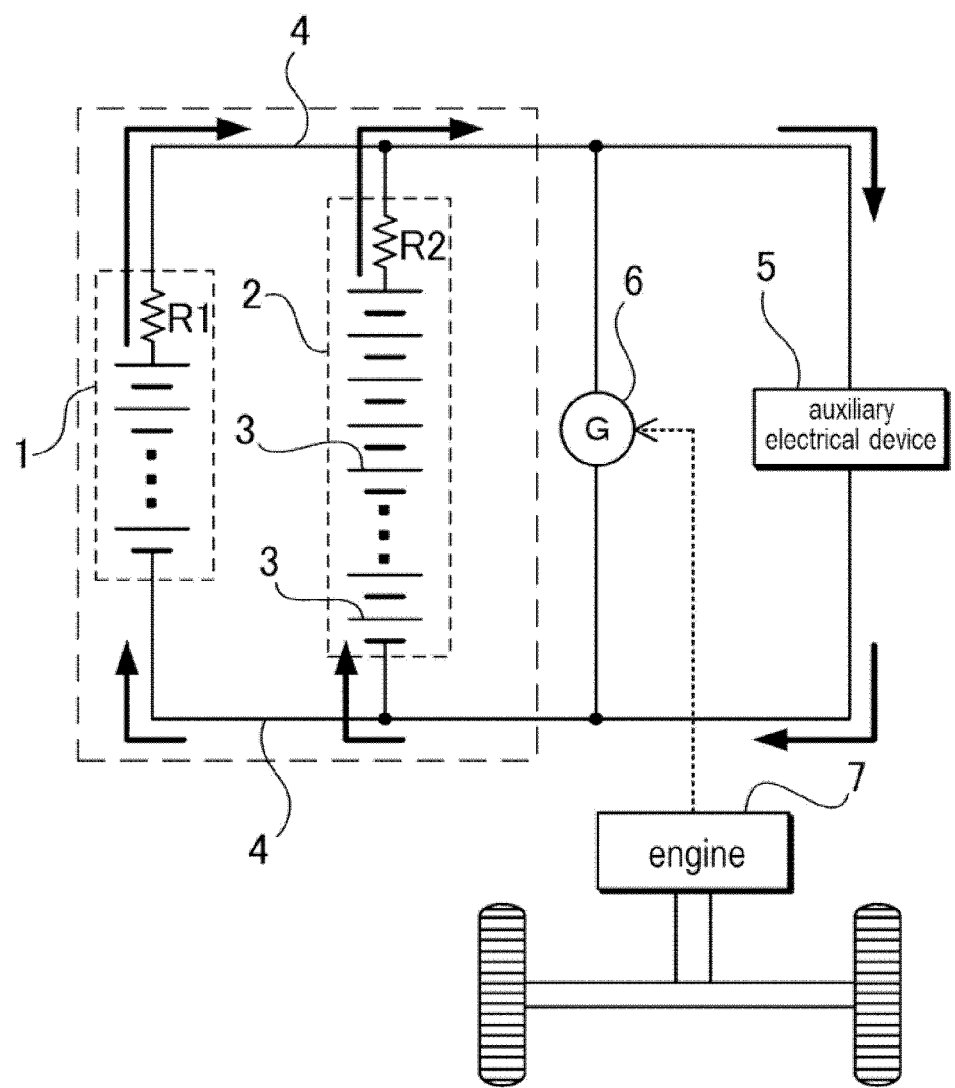

VEHICULAR BATTERY SYSTEM AND VEHICLE EQUIPPED WITH SAME

CROSS-REFERENCE TO RELATED APPLICATIONS

The present application is a U.S. national stage application of PCT International Application No. PCT/JP2012/080909 filed on Nov. 29, 2012, and claims the benefit of foreign priority of Japanese Patent Application No. 2012-195250 filed on Sep. 5, 2012, the contents all of which are incorporated herein by reference.

TECHNICAL FIELD

The present invention is related to a battery system for a vehicle in which a lead battery and a sub-battery are connected in parallel, and a vehicle equipped with the battery system.

BACKGROUND ART

In a conventional vehicle, as an auxiliary battery, a lead battery having a rated voltage of 12V is installed. Further, in a large vehicle, a battery having a rated voltage of 24 V by connecting two of the lead batteries of 12V in series is installed. The lead battery is charged by an alternator in the vehicle, and supplies electric power to auxiliary electrical devices in the vehicle, a starter motor, or the like. This lead battery is heavy and large, and it is necessary to always keep the voltage near the full charge level in order to decrease the degradation and make a life longer. Therefore, the real capacity which is able to be charged and discharged against the rated capacity is small.

Further, when the lead battery is installed in the vehicle having an idle stop function, a life of the battery is remarkably shortened, for example, the life becomes less than a half. Its reason is in the following. In the lead battery charged by power of a regenerative power generation, the voltage of the lead battery is not kept at a constant voltage by an alternator, which is actuated by an engine. The lead battery is charged with very large current at the time of regenerative braking. When the lead battery and alternator supplies electric power to auxiliary electrical devices, the lead battery is not kept at a constant voltage with charging by the alternator. Namely the lead battery does not become in a so-called flouting charge state, the battery voltage is widely varied. As a result, the lead battery is degraded. As a battery system to improve this demerit, a battery system for a vehicle in which the lead battery is connected in parallel to a sub-battery, for example, a nickel hydride battery, a lithium ion secondary battery, or the like, has been developed. (refer to patent literature 1)

CITATION LIST

Patent Literature

Patent Literature 1: Japanese Laid-Open Patent Publication No. 2007-460508

SUMMARY OF THE INVENTION

In the above battery system, the lead battery is connected in parallel to the sub-battery through a DC/DC converter. In this battery system, as the sub-battery is connected in parallel through the DC/DC converter, circuit construction is complicate, and parts cost, or manufacturing cost is increased as the demerit. Especially, when this battery system is installed in the vehicle having an idle stop function, and both the lead battery and the sub-battery are charged by generation power of regenerative braking, it is necessary that a current carrying capacity of the DC/DC converter is very large, and then it remarkably increases parts cost of the DC/DC converter, manufacturing cost. In regenerative braking, even though it is short time, the battery system is charged with very large current of 100 A or more. In the battery system in which the sub-battery is connected through the DC/DC converter, it is difficult to efficiently charge the sub-battery by generation power of regenerative braking. It is a reason why power loss in the DC/DC converter decreases the charging power of the sub-battery.

Further, the battery system for the vehicle in which the lead battery and the sub-battery are connected in parallel, is installed in the vehicle having the idle stop function, and is charged by generation power of regenerative braking, namely power of a regenerative power generation. However, even in this battery system, as adaptability of the lead battery and the sub-battery is not enough, the battery system is not efficiently charged by generation power of regenerative braking, and fuel efficiency cannot be improved enough by regenerative braking.

The present disclosure is developed for the purpose of solving such drawbacks. One non-limiting and explanatory embodiment provides a battery system for a vehicle, and a vehicle equipped with the battery system in which a circuit construction is simple, and degradation of the lead battery is prevented, and then a life can be made longer.

Further, it also provides a battery system for a vehicle, and a vehicle equipped with the battery system which is efficiently charged by generation power of the vehicle, and improves a fuel efficiency by supplying charged power to load of the vehicle side.

In a battery system for a vehicle of the present disclosure, a lead battery is connected in parallel to a sub-battery, and a charging resistance r2 of the sub-battery is lower than a charging resistance r1 of the lead battery.

In the above battery system, degradation of the lead battery is prevented, and then a life can be made longer. It is the reason why the charging resistance of the sub-battery connected in parallel to the lead battery is lower than a charging resistance of the lead battery. In a state that the battery system is charged by an alternator of the vehicle, a charging current of the lead battery becomes smaller than that of the sub-battery, and then the lead battery is not charged with a large current. After charging, the sub-battery charged with a larger charging current than that of the lead battery, charges the lead battery. It happens that the battery system is charged with a large current by generation power of regenerative braking, and the battery system is charged with a large current by increasing the output voltage of the alternator. In this charging state, the sub-battery is charged with a larger current than that of the lead battery. The sub-battery charged with the large current, has a larger charged capacity (Ah) than that of the lead battery by charging. After charging, the sub-battery charged with the large charged capacity (Ah) slowly charges the lead battery, taking the time. Namely, the sub-battery stores the large charged power temporarily, and after that, it charges the lead battery slowly taking the time as a buffer, and then the degradation of the lead battery by the excessive current is prevented.

In addition, the above battery system for the vehicle is efficiently charged by generation power of the alternator, and improves a fuel efficiency by supplying charged power to load of the vehicle side from both the lead battery and the sub-battery. It is the reason why the charging resistance of the sub-battery is lower than the charging resistance of the lead battery, and the sub-battery is efficiently charged with the generation power of the alternator. After charging, the sub-battery efficiently charged with the generation power of the alternator slowly charges the lead battery, and charged power is supplied to load of the vehicle side from both the lead battery and the sub-battery. The battery system having excellent charging efficiency makes a fuel consumed by the engine for the generation a little, and can improve a fuel efficiency of the vehicle In addition, the above charging property is a very important property to the vehicle having an idle stop function in which the battery system is charged by regenerative braking. It is the reason why the battery system is efficiently charged by the generation power of regenerative braking. The regenerative braking charges the battery system with a very large current within a short time of several tens of seconds by braking the vehicle, and in the lead battery the efficiency by a large current is very low, and the sub-battery is efficiently charged. Especially, in the battery system of the present disclosure, as the charging resistance of the sub-battery is set lower than that of the lead battery, the sub-battery is efficiently charged with a large current of regenerative braking.

The above battery system does not limited to regenerative braking, and power is efficiently generated also by the alternator (the alternating current generator) driven by the engine, and the fuel efficiency of the vehicle can be improved. It is the reason why the battery system is charged in a state that a fuel efficiency of the engine is high, and the generation efficiency of the alternator is also high. The engine in its property decreases the fuel efficiency at a light load close to idling. It is apparent that the hybrid car is driven by a motor at a light load, and the fuel efficiency is improved. The engine improves the fuel efficiency by increasing a load, namely increasing a rotating torque of the alternator, and the alternator can increase the generation efficiency by increasing the output of the alternator. Therefore, the fuel efficiency can be improved through increasing a load of the engine by increasing the output of the alternator driven by the engine. Here, the lead battery in its property cannot be charged with a large current in a state that, for example, the output voltage is set at 14V, without the charging current becoming large. However, in the above battery system even though the output voltage of the alternator is set at a constant of 14V, as the sub-battery can be charged with power several times more than that of the lead battery, the battery system can efficiently be charged in a short time by increasing the output of the alternator, or the load of the engine. Accordingly, in the vehicle having no regenerative braking, charging time of the battery system is shortened by the alternator driven by the engine, and the fuel efficiency of the vehicle can be improved by increasing charged capacity during a short time.

In the battery system for the vehicle of the present disclosure, the charging resistance r2 of the sub-battery is lower than the charging resistance r1 of the lead battery, and the discharging resistance R2 of the sub-battery is higher than the discharging resistance R1 of the lead battery.

Accordingly, in the above battery system, as the discharging resistance R2 of the sub-battery is higher than the discharging resistance R1 of the lead battery, in a discharging state, discharging current of the sub-battery is smaller than that of the lead battery. Therefore, the sub-battery is efficiently charged in the charging state, and the discharging load of the sub-battery is decreased in the discharge state, and the degradation of the sub-battery is suppressed or reduced.

In the battery system for the vehicle of the present disclosure, a charging resistance ratio r2/r1 of the charging resistance r2 of the sub-battery to the charging resistance r1 of the lead battery is equal to or less than 0.4, and the discharging resistance R2 of the sub-battery is higher than the discharging resistance R1 of the lead battery.

Accordingly, in the above battery system, the life of the lead battery and sub-battery can be prolonged. It is the reason why the charging resistance of the sub-battery is equal to or less than 0.4 times the charging resistance of the lead battery, and in the charging state the sub-battery is charged with a larger current than that of the lead battery, and in the discharging state the discharging current of the lead battery capable of discharging a large current is increased, and the discharging current of the sub-battery is decreased.

In the battery system for the vehicle of the present disclosure, a discharging resistance ratio R2/R1 of the discharging resistance R2 of the sub-battery to the discharging resistance R1 of the lead battery is equal to or less than 2.4.

Accordingly, in the above battery system, the life of the lead battery can be remarkably prolonged in an ideal state.

In the battery system for the vehicle of the present disclosure, the discharging resistance ratio R2/R1 of the discharging resistance R2 of the sub-battery to the discharging resistance R1 of the lead battery is equal to or more than 1.2, and equal to or less than 2.4.

Accordingly, in the above battery system, the life of the lead battery can be remarkably prolonged in an ideal state.

In the battery system for the vehicle of the present disclosure, the lead battery and the sub-battery are connected in parallel without a voltage conversion circuit.

Accordingly, in the above battery system, as the lead battery and the sub-battery are connected in parallel without a voltage conversion circuit, the circuit construction is made simple, inexpensive.

In the battery system for the vehicle of the present disclosure, the lead battery and the sub-battery are directly connected by a lead wire.

Accordingly, in the above battery system, as the lead battery and the sub-battery are directly connected by the lead wire, as the lead battery and the sub-battery are directly connected by the lead wire, the circuit construction is made most simply, and both the lead battery and the sub-battery can be remarkably efficiently charged or discharged.

In the battery system for the vehicle of the present disclosure, the sub-battery comprises nickel hydride batteries.

In the battery system for the vehicle of the present disclosure, the sub-battery comprises ten pieces of the nickel hydride batteries connected in series.

Accordingly, in the above battery system, as the rated voltage of the lead battery and the sub-battery is set at 12V, the lead battery and the sub-battery can be charged and discharged in well balance.

In the battery system for the vehicle of the present disclosure, the sub-battery comprises non-aqueous electrolyte secondary batteries.

Accordingly, in the above battery system, the sub-battery has the larger battery capacity (Ah) with respect to weight than the lead battery. Further, as the sub-battery comprises non-aqueous electrolyte secondary batteries, the sub-battery can be efficiently charged with a large current of the generation power.

In the battery system for the vehicle of the present disclosure, the lead battery and the sub-battery are installed in a vehicle having an idle stop function, both the lead battery and the sub-battery are charged with power of a regenerative power generation in the vehicle Accordingly, the above battery system can be efficiently charged with generation power of a regenerative braking, and the fuel efficiency of the vehicle having this can be improved. It is the reason why as the battery system is efficiently charged, the fuel consumed by the engine for charging this can be decreased. Especially, in the battery system installed in the vehicle having the idle stop function, as the charging resistance of the sub-battery is smaller than that of the lead battery, an adequate charging capacity in the sub-battery can be kept at the time of generation by actuating the alternator, and the time length of generation by actuating the alternator can be shortened, and then the fuel efficiency of the vehicle can be improved.

In the battery system for the vehicle of the present disclosure, the discharging resistance R2 of the sub-battery is higher than the discharging resistance R1 of the lead battery, and a battery capacity (Ah) of the sub-battery is smaller than a battery capacity (Ah) of the lead battery.

Accordingly, in the above battery system, the sub-battery is made a small battery capacity and inexpensive, and the life of the lead battery can be prolonged.

In the battery system for the vehicle of the present disclosure, the battery capacity (Ah) of the sub-battery to the battery capacity (Ah) of the lead battery is equal to or more than 1/30, and equal to or less than 1/2.

A vehicle of the present disclosure having an idle stop function and equipped with any one of the above battery systems, comprises an engine driving the vehicle, and an alternator being actuated by the engine and charging the battery system.

Accordingly, in the above vehicle, as the battery system can be charged with a large current, the fuel efficiency of the vehicle can be improved. It is the reason why the alternator can be actuated in the range of high generation efficiency, and the engine can drive in the range of a low fuel consumption rate.

A vehicle of the present disclosure having an idle stop function and equipped with any one of the above battery systems, comprises an engine driving the vehicle, and an alternator being actuated by the engine or regenerative braking and charging the battery system.

Accordingly, in the above vehicle, as the sub-battery can be efficiently charged with generation power of regenerative braking, the fuel efficiency of the vehicle can be improved, and the lead battery is protected from a large charging current, and then the life of the lead battery can be prolonged.

BRIEF DESCRIPTION OF DRAWINGS

FIG. 1 is a schematic construction view showing in a charging state of a battery system for a vehicle related to one embodiment of the present invention.

FIG. 2 is a schematic construction view showing in a discharging state of the battery system for the vehicle related to one embodiment of the present invention.

DESCRIPTION OF EMBODIMENTS

Hereinafter, the embodiment of the present invention will be described referring to drawings. However, the following embodiments illustrate a battery system for a vehicle, and a vehicle equipped with the battery system which are aimed at embodying the technological concept of the present invention, and the present invention is not limited to the battery system for the vehicle, and the vehicle equipped with the battery system described below. However, the members illustrated in Claims are not limited to the members in the embodiments.

In the battery system for a vehicle shown in FIG. 1, a lead battery 1 and a sub-battery 2 are connected in parallel. The lead battery 1 and the sub-battery 2 are directly connected by a lead wire 4 without a current adjusting circuit or the like. Therefore, the lead battery 1 and the sub-battery 2 always have the same voltage. But in the battery system, the lead battery and the sub-battery can be connected in parallel through relays, semiconductor switching elements, or the like, and can be also connected in parallel through diodes.

The lead battery 1 has a rated voltage of 12V by connected 6 cells in series. But, the lead battery of this disclosure is not limited to the rated voltage of 12V. It is possible to connect two of the lead batteries in series as the rated voltage of 24V, three of the lead batteries in series as the rated voltage of 36V, or four of the lead batteries in series as the rated voltage of 48V. Conventional auxiliary electrical devices work by power supply voltage of 12V, but the vehicle having the lead battery of 24V to 48V includes auxiliary electrical devices which work at this voltage.

The sub-battery 2 comprises nickel hydride batteries 3. The lead battery 1 of the power supply voltage of 12V is connected in parallel to the sub-battery 2 in which 10 pieces of the nickel hydride batteries 3 are connected in series. As the nickel hydride batteries 3 have the power supply voltage of 1.2V, the voltage of the lead battery and the voltage of the sub-battery 2 are equalized by adjusting the number of series connection of the nickel hydride batteries 3. In place of the nickel hydride batteries, all secondary batteries including, for example, non-aqueous electrolyte secondary batteries of lithium ion secondary batteries, lithium polymer secondary batteries, or the like, can be applied to the sub-battery.

In order that the degradation of the lead battery 1 is prevented, and the efficiency of charging and discharging in the battery system is improved, the sub-battery 2 is connected in parallel to the lead battery 1. By connecting in parallel to the lead battery 1, the sub-battery 2 has the same voltage as the lead battery 1. In this state, a current balance in charging and discharging of the sub-battery 2 and the lead battery 1, is important. In a bad current balance, the life of the lead battery 1 is shortened, and the charging efficiency of the battery system becomes bad, and then a fuel efficiency of the vehicle is decreased. The lead battery 1 is installed in the vehicle having an idle stop function, or is charged with a large current, and the life is shortened. The lead battery 1 is connected in parallel to the sub-battery 2, and it can prevent the degradation of the lead battery 1. However, when the current balance of the lead battery and the sub-battery is bad, even though the sub-battery is connected, the degradation of the lead battery is not effectively prevented. The lead battery and the sub-battery respectively have different charging resistances and different discharging resistances, and the current balances of charging currents and discharging currents vary.

The current balance of the lead battery 1 and the sub-battery 2 is specified or controlled in an optimum state by controlling a charging resistance and a discharging resistance. The charging resistance and the discharging resistance of the sub-battery 2 are adjusted by a facing area between a positive electrode plate and a negative electrode plate. The charging resistance and the discharging resistance of the sub-battery 2 can be made small by making the facing area of the electrode plates large, and can be made big by making the facing area of the electrode plates small. In the battery system, the charging efficiency is improved by making a charging current of the sub-battery 2 large in the charging state, and the discharging current of the lead battery 1 is made large by making the discharging resistance of the lead battery 1 smaller than the discharging resistance of the sub-battery 2.

Preferably, a charging resistance ratio r2/r1 of the charging resistance r2 of the sub-battery 2 to the charging resistance r1 of the lead battery 1 is equal to or less than 0.4. The discharging resistance R2 of the sub-battery 2 is higher than the discharging resistance R1 of the lead battery 1, and preferably a discharging resistance ratio R2/R1 of the discharging resistance R2 of the sub-battery 2 to the discharging resistance R1 of the lead battery 1 is equal to or more than 1.2, and equal to or less than 2.4.

Further, in the sub-battery 2 of the high discharging resistance, a battery capacity (Ah) of the sub-battery 2 can be made smaller than a battery capacity (Ah) of the lead battery 1. For example, the battery capacity (Ah) of the sub-battery 2 to the battery capacity (Ah) of the lead battery 1 is equal to or more than 1/30, and equal to or less than 1/2. The sub-battery 2 like the nickel hydride batteries 3, the lithium ion secondary batteries, or the like, has the larger battery capacity (Ah) with respect to weight than the lead battery 1, and is an expensive secondary battery. The sub-battery 2 can be made inexpensive by making the battery capacity (Ah) small. By the small size of the sub-battery 2 having the small battery capacity (Ah), while the charging efficiency of the battery system is improved, an over charge or an over discharge of the sub-battery 2 is prevented. It is a reason why as the voltages of both batteries are equal by connecting the lead battery 1 and the sub-battery 2 in parallel, the sub-battery 2 and the lead battery 1 are prevented from the over charge and the over discharge by controlling the voltage of the battery system in a predetermined range.

In the battery system, an alternator 6 installed in the vehicle generates electricity. In the alternator 6, an output voltage is controlled by adjusting a current of an exciting coil. The output voltage of the alternator 6 is set to, for example, about 14 V, so as to prevent the battery system from the over charge or the over discharge. As the charging current of the battery system is made large by increasing the output voltage of the alternator 6, the vehicle having the idle stop function, makes the output voltage of the alternator 6 high, and then energy of regenerative braking can be efficiently stored in the battery system. Here, the charging current of the battery system is made large by increasing the output voltage of the alternator 6, and the generation power of regenerative braking can be efficiently stored in the battery system, and then the lead battery 1 is apt to be degraded by being charged with a large current to a high voltage. In order to prevent this harmful influence, by making the charging resistance of the sub-battery 2 small in the above battery system, it is realized that the battery system is highly efficiently charged by a large charging current in a short time by the generation power of regenerative braking, and the degradation of the lead battery 1 by the large charging current is prevented. After charging, the sub-battery 2 charged by the large current of regenerative braking, charges the lead battery 1 slowly taking the time, by discharging the sub-battery 2 in itself. The sub-battery 2 discharged through charging the lead battery 1 is charged again by a large current in next regenerative braking, and then the charging efficiency by a large current charging in the battery system is improved. In the discharging state, as the sub-battery 2 having the small battery capacity (Ah) has the higher discharging resistance than the lead battery 1, the discharging current of the sub-battery 1 is smaller than that of the lead battery 1, and discharging load of the sub-battery 2 is decreased.

[Battery System of Example 1 to 3, and Comparative Example]

In the battery system for the vehicle, the following lead battery 1 and the following sub-battery 2 of the nickel hydride batteries 3 are connected in parallel.

(Lead Battery 1)

As the lead battery 1, the batteries which meet the following performances under the test condition provided by STANDARD OF BATTERY ASSOCIATION OF JAPAN (SBA S 0101) are used.

Capacity per 5 hours: 48 Ah

Rated cold cranking current: 320 A

Acceptability of charging: 6.0 A (Sub-Battery 2)

In the sub-battery 2, 10 pieces of the nickel hydride batteries 3 are connected in series. In the nickel hydride battery 3, the electrode assembly comprises the positive electrode plate having nickel hydroxides as a main positive active material, the negative electrode plate having metal hydrides as a negative active material, and a separator. This electrode assembly is inserted into the outer can with alkaline electrolyte, and the battery having the capacity of 6.0 Ah is obtained. In this nickel hydride battery 3, the charging resistance and the discharging resistance are adjusted by controlling the facing area between the electrode plates.

After the following state is adjusted, the lead battery 1 and the nickel hydride batteries 3 are connected in parallel through the lead wire 4 as the battery system.

Under the condition provided by STANDARD OF BATTERY ASSOCIATION OF JAPAN (SBA S 0101), namely, the lead battery 1 is charged with 0.2 It of charging current, until the terminal voltage during charging in 15 minutes time intervals, and the electrolyte density by temperature correction shows a constant value in the 3 consecutive measurements, and after 24 hour leaving in a normal temperature, the voltage of the open circuit is measured.

After the nickel hydride batteries 3 of the sub-battery 2 are charged with a charging current of 1 It till 110% of the battery capacity, the nickel hydride batteries 3 are discharged with a current of 1 It by a predetermined capacity. And after 24 hour leaving in a normal temperature, when the difference of the open circuit voltages between the lead battery 1 and the nickel hydride batteries 3 is 0.1V or less, the nickel hydride batteries 3 are connected in parallel to the lead battery 1.

Three types of the nickel hydride batteries 3 having different charging and discharging resistances are made, and as shown in Table 1, examples 1, 2, 3 of the battery systems having different values of the charging resistance ratios r2/r1 and discharging resistance ratio R2/R1 are made.

In the present specification, the discharging resistance of the lead battery 1 or the sub-battery 1 is calculated in the following way.

The battery system in which the lead battery 1 and the sub-battery 2 are connected in parallel is discharged with 200 A and for 10 seconds, and the open circuit voltage before starting discharging and at the time of the tenth seconds are measured. At this time, each current of the lead battery 1 and the nickel hydride batteries 3 is measured by Hall sensors.

The discharging resistance (R) of the lead battery 1 or the nickel hydride batteries 3 of the sub-battery 2 is obtained in the following equation. The discharging resistance (R) of the lead battery 1 or the nickel hydride batteries 3 is calculated the quotient that the voltage variation (E0–E1) is divided by the current (I) of the lead battery 1 or the nickel hydride batteries 3, wherein the voltage variation (E0–E1) is calculated the difference from the battery voltage in a state before starting, namely the open circuit voltage (E0) of the battery, and the voltage (E1) at the time of the tenth seconds. As the discharging resistance (R) of each of the batteries is in inverse proportion to the current (I), the lead battery 1 and the nickel hydride batteries 3 have different discharging current values, and then have different discharging resistance values. As the discharging resistance is in inverse proportion to the discharging current, the nickel hydride batteries 3 having a small discharging current value have a larger discharging resistance value than that of the lead battery.

$$R=(E0-E1)/I$$

In the present specification, the charging resistance of the lead battery 1 or the sub-battery 1 is calculated in the following way.

The battery system in which the lead battery 1 and the sub-battery 2 are connected in parallel is charged with 100 A and for 10 seconds, and the open circuit voltage before starting charging and at the time of the tenth seconds are measured.

The charging resistance (r) of the lead battery 1 or the nickel hydride batteries 3 of the sub-battery 2 is obtained in the following equation. The charging resistance (r) of the lead battery 1 or the nickel hydride batteries 3 is calculated the quotient that the voltage variation (E2–E0) is divided by the current (I) of the lead battery 1 or the nickel hydride batteries 3, wherein the voltage variation (E2–E0) is calculated the difference from the voltage (E2) at the time of the tenth seconds and the battery voltage in a state before starting, namely the open circuit voltage (E0) of the battery. As the charging resistance (r) of each of the batteries is in inverse proportion to the current (I), the lead battery 1 and the nickel hydride batteries 3 have different charging current values, and then have different charging resistance values. As the charging resistance is in inverse proportion to the charging current, the nickel hydride batteries 3 having a large charging current value have a smaller charging resistance value than that of the lead battery.

$$R=(E2-E0)/I$$

The battery system of Example 1 has the charging resistance ratio r2/r1 of 0.2, and the discharging resistance ratio R2/R1 of 1.2, by adjusting the charging resistance and the discharging resistance of the nickel hydride batteries used as the sub-battery.

The battery system of Example 2 has the charging resistance ratio r2/r1 of 0.3, and the discharging resistance ratio R2/R1 of 1.7, by adjusting the charging resistance and the discharging resistance of the nickel hydride batteries used as the sub-battery.

The battery system of Example 3 has the charging resistance ratio r2/r1 of 0.4, and the discharging resistance ratio R2/R1 of 2.4, by adjusting the charging resistance and the discharging resistance of the nickel hydride batteries used as the sub-battery.

For the comparison, the nickel hydride batteries having the different charging and discharging resistance are made, and Comparative example 1, 2 as the battery system are made.

The battery system of Comparative example 1 has the charging resistance ratio r2/r1 of 0.4, and the discharging resistance ratio R2/R1 of 2.6, by adjusting the charging resistance and the discharging resistance of the nickel hydride batteries used as the sub-battery.

The battery system of Comparative example 1 has the charging resistance ratio r2/r1 of 0.5, and the discharging resistance ratio R2/R1 of 2.7, by adjusting the charging resistance and the discharging resistance of the nickel hydride batteries used as the sub-battery.

Examples 1 to 3, and Comparative examples 1 and 2 which are mentioned above, are charged and discharged repeatedly under the following condition, those lives are shown in Table 1. The battery system reached the end of the life by the degradation of the lead battery.

Under the condition provided by STANDARD OF BATTERY ASSOCIATION OF JAPAN (SBA S 0101), the following idle stop life test is carried out while the charging and discharging are repeated. At the temperature 25° C.±2° C. (wind speed 2.0 m/s or less), after the first discharge is carried out with a discharging current of 45 A±1 A for 59.0 seconds±0.2 seconds, the second discharge is carried out with a discharging current of 300 A±1 A for 1.0 seconds±0.2 seconds, and after that, it is charged at the charging voltage of 14.00V±0.03V (restricted current 100.0 A±0.5 A) for 60.0 seconds ±0.3 seconds. This charging and discharging procedure is repeated. Every 3600 times of the above procedures, after leaving it for 40-48 hours, the charging and discharging procedure is started again.

The life of the battery system is determined as the cycle number when the voltage of the battery system becomes less than 7.2 V as the discharge end voltage in the second discharge. In Table 1, as the reference example, the life of the lead battery in itself without connecting the sub-battery is measured, and the life property in each battery is normalized by the life property of the lead battery in itself.

TABLE 1

| | resistance ratio | | |
|---|---|---|---|
| | charging resistance ratio r2/r1 | discharging resistance ratio R2/R1 | life property |
| Example 1 | 0.2 | 1.2 | 300 |
| Example 2 | 0.3 | 1.7 | 290 |
| Example 3 | 0.4 | 2.4 | 270 |
| Com. Ex. 1 | 0.4 | 2.6 | 130 |
| Com. Ex. 2 | 0.5 | 2.7 | 105 |
| Ref. Ex. | — | — | 100 |

From the result of Table 1, in Example 1, 2, and 3, the discharging resistance R2 of the nickel hydride batteries is higher than the discharging resistance R1 of the lead battery, and the charging resistance ratio r2/r1 of the charging resistance r2 of the nickel hydride batteries to the charging resistance r1 of the lead battery is equal to or less than 0.4, and the life properties are widely improved since the life properties are about 3 times more than that of the lead battery in itself. Here, in each battery system, the life is reached due to the degradation of the lead battery.

Further, as shown in Comparative example 1, the discharging resistance ratio R2/R1 of the discharging resistance R2 of the nickel hydride batteries to the discharging resistance R1 of the lead battery is more than 2.4, and is 2.6, even though the nickel hydride batteries as the sub-battery is connected, its life property is 130%, improved by only 30%. It is the reason why as the discharging resistance of the nickel hydride batteries in too big, the discharge load of the lead battery is not adequately decreased by the sub-battery.

In addition, as shown in Comparative example 2, the charging resistance ratio r2/r1 of the charging resistance r2 of the nickel hydride batteries to the charging resistance r1 of the lead battery is more than 0.4, even though the nickel hydride batteries as the sub-battery is connected, its life property is 105%, and is hardly improved. It is the reason why as the adequate regenerative charging by the sub-battery is not realized in this battery system, the degradation of the lead battery due to the repeated charging and discharging is not adequately suppressed or reduced.

The measured result of Table 1 shows the following. In the battery system in which the lead battery and the sub-battery are connected in parallel, the discharging resistance R2 of the sub-battery is higher than the discharging resistance R1 of the lead battery, and the charging resistance ratio r2/r1 of the charging resistance r2 of the sub-battery to the charging resistance r1 of the lead battery is equal to or less than 0.4, and the life properties are remarkably improved, and it is possible that the life properties are more widely prolonged than conventional art.

Especially, while the above battery system is repeatedly charged with a large current of 100 A, as the life property can be remarkably improved more than 3 times, the life of the battery system which is installed in the vehicle having the idle stop function, can be widely prolonged. Further, as the battery system can be very efficiently charged with regenerative generation power of regenerative braking by making the charging resistance of the sub-battery 2 small, in the above battery system, energy generated by regenerative braking can be efficiently stored, and the stored power is efficiently supplied to the auxiliary electrical device 5 of the vehicle side. Therefore, the vehicle equipped with the battery system makes the energy with which the alternator 6 for charging is driven by the engine 7 remarkably reduced, and it is realized that the fuel efficiency of the vehicle can be remarkably improved.

The above battery system does not limited to regenerative braking of the vehicle having the idle stop function, also in the vehicle in which the battery system is charged with a large current by the alternator 6 driven by the engine 7, the life property is remarkably improved, and the fuel efficiency of the vehicle can be remarkably improved. In order that the alternator 6 charges the lead battery 1 with a constant voltage while the degradation is reduce, and supplies a constant voltage to the auxiliary electrical device 5, the output voltage of the alternator 6 is always stabilized at a constant voltage of about 14 V. Therefore, the alternator 6 charges the lead battery 1 with a small current, without a large current. Even though the vehicle has the alternator 6 having the output current of 100 A, the alternator 6 does not charge the lead battery 1 with the current of 100 A, but the alternator 6 has the large output current in order to supply power to the auxiliary electrical device 5. The fuel efficiency of the vehicle can be remarkably improved by the alternator 6 charging the battery system with the large current. It is the reason why the alternator 6 is driven in the range of the high generation efficiency, and the engine 7 is driven in the range of a low fuel consumption rate. In the alternator 6, the generation efficiency is low at a light load, and in the engine 7, the fuel consumption rate is high at a light load.

In the above examples, the nickel hydride batteries 3 are used as the sub-battery 2. In addition, also in the lithium ion secondary batteries, or the lithium polymer secondary batteries, the life property of the lead battery can be improved, and a charging efficiency and a discharging efficiency of regenerative braking or the alternator can be improved, by adjusting the charging resistance and the discharging resistance to the optimum values in the same way as the nickel hydride batteries through controlling the facing area between the positive electrode plate and the negative electrode plate.

INDUSTRIAL APPLICABILITY

A battery system for a vehicle of the present invention is suitable for a vehicle having an idle stop function in which the battery system is charged by regenerative braking, since a fuel efficiency of the vehicle is improved by efficiently charging with generation power and the life property of the battery system is improved.

The invention claimed is:
1. A battery system for a vehicle comprising:
    a lead battery having a charging resistance r1; and
    a sub-battery being connected to the lead battery in parallel, and having a charging resistance r2,
    wherein the charging resistance r2 of the sub-battery is lower than the charging resistance r1 of the lead battery, and
    a charging resistance ratio r2/r1 of the charging resistance r2 of the sub-battery to the charging resistance r1 of the lead battery is equal to or less than 0.4, and a discharging resistance R2 of the sub-battery is higher than a discharging resistance R1 of the lead battery.
2. The battery system for the vehicle according to claim 1,
    wherein a discharging resistance ratio R2/R1 of the discharging resistance R2 of the sub-battery to the discharging resistance R1 of the lead battery is equal to or less than 2.4.
3. The battery system for the vehicle according to claim 1,
    wherein a discharging resistance ratio R2/R1 of the discharging resistance R2 of the sub-battery to the discharging resistance R1 of the lead battery is equal to or more than 1.2, and equal to or less than 2.4.
4. The battery system for the vehicle according to claim 1,
    wherein the lead battery and the sub-battery are connected in parallel without a voltage conversion circuit.
5. The battery system for a vehicle according to claim 4,
    wherein the lead battery and the sub-battery are directly connected by a lead wire.
6. The battery system for the vehicle according to claim 1,
    wherein the sub-battery comprises nickel hydride batteries.
7. The battery system for the vehicle according to claim 6,
    wherein the sub-battery comprises ten pieces of the nickel hydride batteries connected in series.
8. The battery system for the vehicle according to claim 1,
    wherein the sub-battery comprises non-aqueous electrolyte secondary batteries.
9. The battery system for the vehicle according to claim 1,
    wherein the lead battery and the sub-battery are installed in a vehicle having an idle stop function, and both the lead battery and the sub-battery are charged with power of a regenerative power generation in the vehicle.

10. The battery system for the vehicle according to claim 1, wherein a battery capacity (Ah) of the sub-battery is smaller than a battery capacity (Ah) of the lead battery.

11. The battery system for the vehicle according to claim 1, wherein a ratio of a battery capacity (Ah) of the sub-battery to a battery capacity (Ah) of the lead battery is equal to or more than 1/30, and equal to or less than 1/2.

12. A vehicle having an idle stop function and equipped with the battery system according to claim 1, comprising:
an engine driving the vehicle; and
an alternator being actuated by the engine, and charging the battery system.

13. A vehicle having an idle stop function and equipped with the battery system according to claim 1, comprising:
an engine driving the vehicle; and
an alternator being actuated by the engine or regenerative braking, and charging the battery system.

* * * * *